Sept. 15, 1936.                    J. G. McCOMB                    2,054,508
                                  SIGNALING DEVICE
                                 Filed July 3, 1935                2 Sheets-Sheet 1

Inventor:
James G. McComb
By Davis, Macauley, May,
Lindsey & Smith
Attys.

Sept. 15, 1936.      J. G. McCOMB      2,054,508
SIGNALING DEVICE
Filed July 3, 1935      2 Sheets-Sheet 2

Inventor:
James G. McComb

Patented Sept. 15, 1936

2,054,508

UNITED STATES PATENT OFFICE 2,054,508

SIGNALING DEVICE

James G. McComb, Chicago, Ill.

Application July 3, 1935, Serial No. 29,669

5 Claims. (Cl. 177—337)

My invention relates to a signaling device and more particularly to a signal control system for motor vehicles, wherein lights on the vehicle are operated to flash in alternation upon actuation either by depression of the braking element or by a control mounted on the dash.

One of the objects of my invention is to provide a signaling system wherein upon depression of the brake pedal the signal lights on the rear of the vehicle will be caused to alternately flash on and off to warn cars following that the brakes are being applied.

Another object is to provide a signaling system for a motor vehicle in which the alternating of the signal lights are controlled from the dash and also in which the actuation of the dash control will operate to keep one of the lights lit as a stop light even though the motor of the vehicle is not in operation.

Another object is to provide a signaling system for a motor vehicle in which the distributor rotor actuates a flasher device for producing the on and off flash of the signals.

Another object is to provide a signaling system in which the rate of alternation or flash on and off of the signal is determined by the relative speed of the motor vehicle.

Another object is to provide a signaling device for attachment to a motor vehicle distributor which is cheap to manufacture and easy to install and which possesses a minimum of moving parts.

Motor vehicles are ordinarily provided with a rear signal light which remains lighted when and as long as the brake is depressed. However, I have found that the attention of the driver in the vehicle following, can be more readily attracted and he may be warned that the vehicle is being stopped by effecting a flashing of the signal light, either of one light or by an alternating off and on flashing of two or more lights. By connecting my signaling system directly with the distributor of the car, I have eliminated the expense of other motive power, such as an electric motor or the like, and have made the speed of the signal flashings dependent upon the relative speed of the motor.

Referring to the drawings, it will be seen that

Fig. 6 is a modified form of my invention taken on the line 6—6 of Fig. 7 and also showing a diagrammatic view of the electrical circuit;

Fig. 7 is a cross-section taken on the line 7—7 of Fig. 6; and

Fig. 8 is a plan view of the commutator support and segments used with the construction shown in Figs. 6 and 7.

Figure 3:
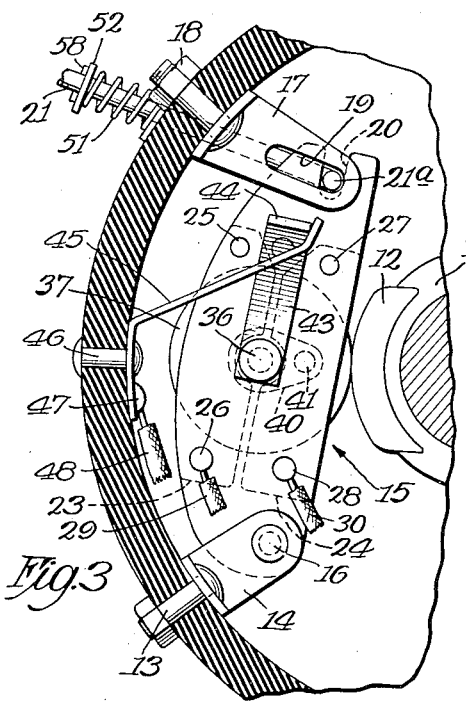
Fig. 3 is an enlarged view on the line 3—3 of Fig. 2 showing the parts in operative engagement.

In the specific embodiment of my invention, 10 shows a distributor housing provided with the usual rotor 11. Secured to the hub of the rotor as by wedging, vulcanization or the like is a bearing strip 12 formed of rubber, which is offset outwardly with respect to the face of the hub. Mounted at the side of the housing as by a nut and bolt 13, is a right-angled brace 14 upon which the switch or commutator support, indicated generally as 15, is adapted to be supported for oscillation by a pin 16. The opposite end of the commutator support rests on a right-angled brace 17 which is secured to the housing by a nut and bolt 18. The horizontal portion of the brace is provided with a slot 19 which is in alignment with a recess 20 formed in the commutator support. The bent end 21ᵃ of an actuating rod 21 fits within the slot and recess 19 and 20, respectively. The rod extends exteriorly of the housing through an opening 22 and is suitably connected to the brake pedal and dash control presently to be described. The commutator support 15 is provided with a pair of electric conducting segments or commutators 23 and 24 which are suitably secured thereto as by pins 25, 26, 27 and 28. Soldered to the pins 26 and 28 are electric conducting wires 29 and 30, each leading to their respective signal lamps 31 and 32. The lamps are grounded as at 33 and 34. Centrally of the commutator support is an opening 35 through which extends a stationary metallic shaft 36 on which is rotatably mounted a disk 37. The disk is held in place on the shaft by a spring 38 and nut 39. Mounted on the upper face of the disk is a metal strip 40 which is held in place by a metallic pin 41 which extends through said disk and projects slightly beyond the bottom thereof for electrical contact with the commutator segments. The metal strip 40 has an opening 42 which registers with the disk opening. It will be seen that the metallic segments are spaced in proximity to each other so that the pin will bridge the segments in passing from one to the other, so that no arcing will result. Soldered to the stationary shaft 36 is a metal strip 43 which forms one part of a switch. This strip has a right-angled bend 44 at its end and is adapted to engage the other contact member 45 of the switch. The contact 45 is secured to the wall of the housing by a bolt 46. Soldered to the contact 45 as at 47 is a conductor wire 48 which leads to one terminal of a battery, 49. The other battery terminal is grounded as at 50.

Figure 2:
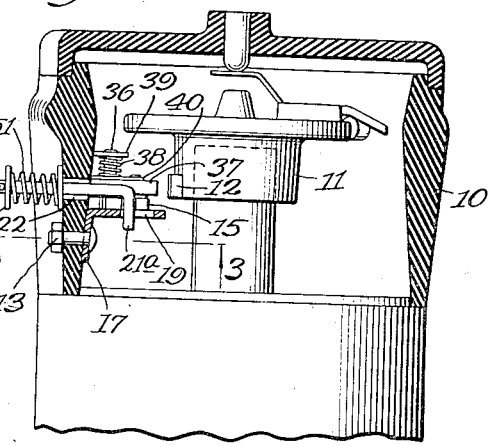
Fig. 2 is a view partly in section taken on the line 2—2 of Fig. 1 and diagrammatically showing the brake pedal and dash control.
Figure 4:
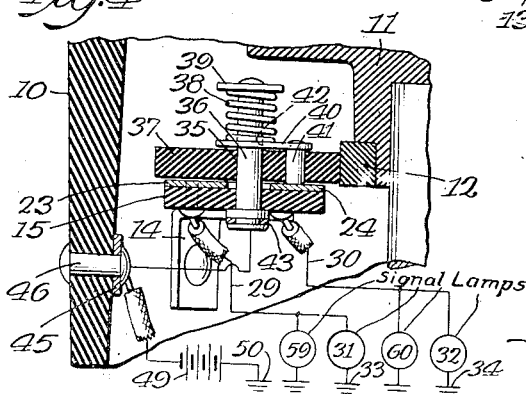
Fig. 4 is a cross-section on the line 4—4 of Fig. 1 and also showing a diagrammatic view of the electrical circuit.

Referring to Fig. 2, it will be seen that the actuating rod 21 is held outwardly by a spring 51, one end of which rests against a washer 52 secured to the actuating rod and the other end against the distributor housing. Pivotally mounted to the car as at 53 intermediate the brake pedal and distributor housing is a swinging hinge 54 against which the brake pedal 55 is adapted to bear when it is depressed. The actuating rod is pivotally connected to the hinge as at 56. Also loosely positioned on the rod 21 is a fork 57, connected to a rod 59 which leads to the dash 60 of the vehicle. The fork 57 bears against a fixed pin 58 on the rod 21. The rod 59 is suitably secured to the dash in any well-known manner, as by a pawl and ratchet arrangement so that the rod can be depressed to operate the signaling system and remain locked in that position. Thus it will be seen that the signaling system can be put into operation by actuating either the brake pedal or the dash control and that each will operate independently of the other.

Figure 1:
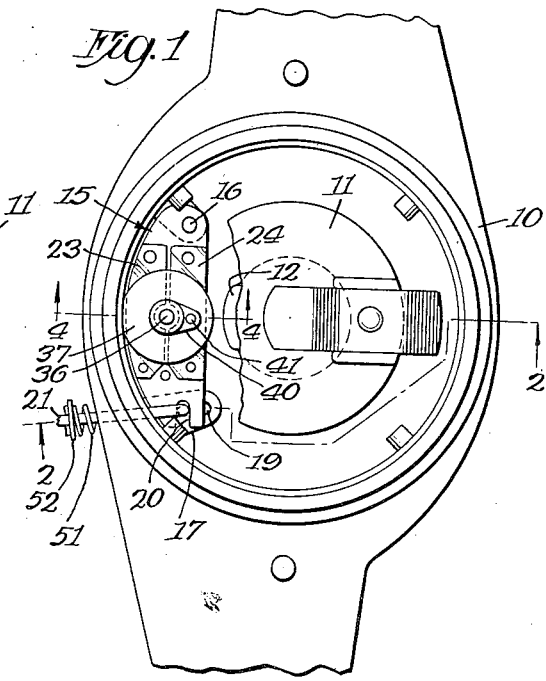
Figure 1 is a top plan view of a distributor housing (with the cover thereof removed) with my invention mounted therein and showing the parts disengaged.

It will be seen that as the distributor rotor is rotating and the parts are in the position shown in Fig. 1 no alternating flashing will be effected, but that as soon as the commutator is brought into engagement with the distributor rotor, shown in Fig. 3, as when the brake pedal or dash control is depressed, the switch contacts are closed and the electrical current will flow from the battery 49, through conducting wire 48, the switch contacts 45 and 43, shaft 36, metallic segment 40, pin 41, one of the commutator segments 23 or 24, and through their respective pins 26 and 28 to the conductor wires 29 and 30 and signal lamps 31 and 32. It is understood that as the disk rotates over the commutator segments, first one circuit will be closed and then the other, thus producing the alternating flashing on and off of the signal lamps 31 and 32. Other signal lamps such as 59 and 60 can be placed in the circuit by wiring them parallel to the lamps 31 and 32.

Figure 5:
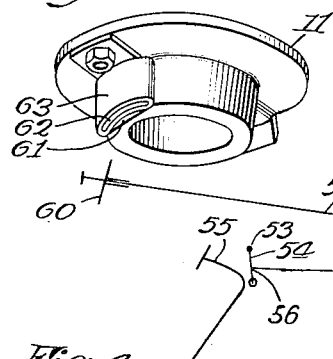
Fig. 5 is a perspective view of a distributor rotor with a modified form of bearing strip.

Instead of vulcanizing or wedging the bearing strip within the hub of the distributor rotor the strip can be mounted as shown in Fig. 5. The hub is flattened as at 61 and a strip of resilient material 62 covered by rubber 63 is secured to the top of the rotor. The strip is curved but is mounted so that it is offset with respect to the axis of the hub.

Referring to my modified form of construction shown in Figs. 6, 7 and 8, it will be seen that the distributor is provided with the usual rotor 71, to the top portion of which is pivotally secured a pawl 73 as by a bolt and nut 72. The pawl is provided with an end portion 74 which rests against the hub of the rotor. The pawl is tensioned forwardly by a spring 75, the other end of the spring is secured to the rotor at 76. Oscillatably secured to one side of the distributor housing as by a brace 78 and pin 79 is a switch or commutator support member 80. The other end of the commutator support rests on a brace 81 which is suitably secured to the distributor housing. One end of an actuating rod 82 (which leads from the brake pedal and dash control) is secured to the commutator support as at 83 and extends within the arcuate slot 84 which is provided in the brace 81.

Suitably mounted on the commutator support are two L-shaped metallic segments 85 and 86 and two rectangular metallic segments 87 and 88, all of which segments are connected in circuit with signal lamps presently to be described. The commutator support has an opening 89 through which extends a metallic shaft 90 which supports a rotatable switching member 91. The switching member has mounted thereon a metallic segment 92 provided with an opening which registers in alignment with the opening in the rotating switch member. Contacting with the segment 92 and extending through the rotating switch member is a metal pin 93 which makes contact with the commutator segments. Secured to the switch member by a bolt 91ª is a disk 91ᵇ having teeth 91ᶜ. It will be seen that one side of the distributor housing has an opening which accommodates a portion of the commutator support and through which a portion of the teeth of the rotating switch are adapted to extend for engagement with the pawl 73. Directly under the shaft 90 for contact therewith is a metal strip 95 which is secured to the distributor housing by a bolt 96. Connected to this bolt is a conducting wire 97 which leads to one terminal of a battery 98. The battery is grounded as at 107. Suitably connected to the segments 85 and 86 of the commutator are conducting wires 99 and 100 which lead to a signal lamp 101. Connected to the segments 86 and 87 are conducting wires 103 and 104 which lead to a signal lamp 105. These lamps are grounded at 102 and 106 respectively. It will be understood that instead of having two conducting wires lead to one signal lamp as shown, each wire can lead to a separate signal lamp.

The operation is as follows: As the actuator rod 82 is operated, the commutator support will be moved inwardly to the position indicated in Fig. 6 which will bring the teeth of the switch into the path of the pawl on the rotor. The metal strip will then make contact with the shaft 90 to close the circuit. With each revolution of the rotor a new tooth will be engaged and the switch member 91 will be caused to rotate to make contact through the pin 93 with one of the segments on the commutator. The circuit will be from the battery 98, through conducting wire 97, metal strip 95, shaft 90, metal segment 92, pin 93, to the particular segment of the commutator over which the pin is passing, then through one of the conducting wires to the signal lamps. As the rotor is operating an alternating flashing on and off of the signal lamps will be produced.

While I have rather specifically illustrated and described my invention, it will be understood that modifications may occur, and therefore I do not wish to be limited to such precise disclosure, but what I claim as new and desire to secure by Letters Patent, is:

I claim:

1. A motor vehicle operated signalling system including a plurality of signal lamps, a rotor operated by the engine of the motor vehicle, said rotor having an engaging member thereon and movable therewith, a switching unit including a support having a plurality of commutator segments succcessively connected in electrical circuit with said signal lamps, a rotating switching member mounted on said support and making successive contact with said commutator segments, means for moving said support to move said switching member into the path of rotation of said rotor engaging member, said engaging member being constructed to engage the switching member for only a portion of the revolution of said rotor so that said engaging member will engage said switching member for partial rotation to make and break contact with said segments to open and close the circuits to successively flash said lamps at a rate dependent upon the speed of the rotor.

2. A motor vehicle operated signaling system including a signal lamp, a brake actuating mechanism, a rotor operated by the engine of the motor vehicle, said rotor having an actuating member movable therewith, a switching member in electrical circuit with said signal lamp, means for normally maintaining said switching member out of engagement with said actuating member, means for moving said switching member upon the actuation of said brake mechanism into the path of rotation of said actuating member, said actuating member being constructed to engage the switching member for only a portion of the revolution of said rotor so that said switching member is periodically engaged to cause said switching member to be fractionally rotated to produce a flashing of said signal lamp at a rate dependent upon the rate of rotation of said rotor.

3. A distributor operated signalling system for motor vehicles including a distributor rotor, a signal lamp, an actuating member movable with said rotor, a switch which includes a movable support having electrical conducting means in electrical circuit with said signal lamp, a disc carried by said support and having electrical conducting means engageable with said first mentioned conducting means, means for moving said support to move said disc into the path of rotation of said actuating member, said actuating member being constructed to engage the disc for only a portion of the revolution of said distributor rotor to cause said disc to rotate periodically to make and break the circuit to said signal lamp at a rate dependent upon the rotation of said distributor rotor.

4. A distributor operated signalling system for motor vehicles including a distributor rotor, a plurality of signal lamps, an actuating member movable with said rotor, a switch which includes a movable support having a plurality of electrical conducting means successively connected in electrical circuit with said signal lamps, a disc carried by said support and having electrical conducting means succcessively engageable with said first mentioned conducting means, means for moving said support to move said disc into the path of rotation of said actuating member, said actuating member being constructed to engage the disc for only a portion of the revolution of said distributor rotor to cause said disc to rotate periodically to successively make and break the circuit to said signal lamps at a rate dependent upon the speed of the rotor.

5. A distributor operated signalling system for a motor vehicle, a plurality of signal lamps, a distributor rotor, an actuating member movable with said rotor, a switching member including a movable support having commutator segments, said segments successively connected in electrical circuit with said signal lamps, a rotatable disc carried by said support and movable therewith and having means thereon adapted to make successive contact with said segments, another switch associated with said support adapted to be closed when said support and disc are moved in the path of rotation of said actuating member, said last mentioned switch being in circuit with each of said segments so that as said disc is moved from one segment to another the circuit through said respective segments will be closed to produce a successive flashing of said signal lamps, and means for moving said support and disc out of the path of rotation of said actuating member and thereby also causing the opening of said last mentioned switch.

JAMES G. McCOMB.